(12) United States Patent
Hirth et al.

(10) Patent No.: US 11,192,058 B2
(45) Date of Patent: Dec. 7, 2021

(54) HONEYCOMB BODY FOR EXHAUST GAS AFTERTREATMENT

(71) Applicant: CONTINENTAL AUTOMOTIVE GmbH, Hannover (DE)

(72) Inventors: Peter Hirth, Rösrath (DE); Christoph Pabst, Melle (DE)

(73) Assignee: Vitesco Technologies GmbH, Hannover (DE)

( * ) Notice: Subject to any disclaimer, the term of this patent is extended or adjusted under 35 U.S.C. 154(b) by 483 days.

(21) Appl. No.: 16/304,656

(22) PCT Filed: May 18, 2017

(86) PCT No.: PCT/EP2017/062041
§ 371 (c)(1),
(2) Date: Nov. 26, 2018

(87) PCT Pub. No.: WO2017/202696
PCT Pub. Date: Nov. 30, 2017

(65) Prior Publication Data
US 2020/0324240 A1    Oct. 15, 2020

(30) Foreign Application Priority Data
May 25, 2016 (DE) .......................... 102016209058.5

(51) Int. Cl.
*F01N 3/28* (2006.01)
*B01D 46/24* (2006.01)
*F28F 3/02* (2006.01)

(52) U.S. Cl.
CPC ..... *B01D 46/2466* (2013.01); *B01D 46/2459* (2013.01); *F01N 3/281* (2013.01);
(Continued)

(58) Field of Classification Search
CPC . B01D 46/2466; B01D 46/2459; F01N 3/281; F01N 2330/02; F01N 2330/32; F28F 3/025
(Continued)

(56) References Cited

U.S. PATENT DOCUMENTS 4,152,302 A    5/1979  Nonnenmann et al.
4,665,051 A *  5/1987  Nonnenmann ......... F01N 3/281
                                                    502/439
(Continued)

FOREIGN PATENT DOCUMENTS

CN    1303321    7/2001
CN    1373693    10/2002
(Continued)

*Primary Examiner* — Tom P Duong
(74) *Attorney, Agent, or Firm* — Cozen O'Connor

(57) ABSTRACT

A honeycomb body for exhaust gas aftertreatment, having a multiplicity of stacked layers. Flow channels are formed between the layers, which extend along the axial extent of the honeycomb body and are flowed through in the axial direction. The honeycomb body has first structured layers formed by successive wave peaks and wave valleys. Protuberances in the direction of the wave peaks belonging to a respective layer are formed from adjacently arranged wave valleys of a first structured layer. The adjacently arranged protuberances of a first structured layer form a channel-like structure extending in the circumferential direction in the first structured layer into which a second layer is inserted to be is fixed in the axial direction with respect to the first structured layer.

21 Claims, 4 Drawing Sheets

(52) U.S. Cl.
CPC .......... *F28F 3/025* (2013.01); *B01D 2279/30* (2013.01); *F01N 2330/02* (2013.01); *F01N 2330/32* (2013.01)

(58) Field of Classification Search
USPC ........................................................ 428/116
See application file for complete search history.

(56) References Cited

U.S. PATENT DOCUMENTS

| | | | |
|---|---|---|---|
| 4,672,809 A | | 6/1987 | Cornelison et al. |
| 5,045,403 A | * | 9/1991 | Maus ...................... F01N 3/281 |
| | | | 428/593 |
| 5,567,395 A | * | 10/1996 | Okabe ...................... B01J 35/04 |
| | | | 422/177 |
| 6,190,784 B1 | * | 2/2001 | Maus ...................... B01J 35/04 |
| | | | 428/593 |
| 6,667,013 B1 | | 12/2003 | Nilsson |
| 7,682,705 B2 | * | 3/2010 | Hodgson ................ B01J 35/04 |
| | | | 428/593 |
| 7,709,076 B2 | * | 5/2010 | Maus ...................... F01N 3/281 |
| | | | 428/116 |
| 7,727,498 B2 | * | 6/2010 | Hodgson ............... F01N 3/0231 |
| | | | 423/210 |
| 7,871,576 B2 | * | 1/2011 | Bruck ...................... B01J 35/04 |
| | | | 422/180 |

FOREIGN PATENT DOCUMENTS

| | | |
|---|---|---|
| CN | 1429130 | 7/2003 |
| CN | 1604989 | 4/2005 |
| CN | 1199714 C | 5/2005 |
| CN | 1930382 | 3/2007 |
| CN | 100476168 C | 4/2009 |
| CN | 102119315 | 7/2011 |
| DE | 27 33 640 | 8/1979 |
| DE | 29 02 779 | 7/1980 |
| DE | 35 17 035 | 10/1986 |
| DE | 38 44 350 | 7/1990 |
| DE | 100 20 170 | 9/2001 |
| DE | 10 2004 001 947 | 8/2005 |
| EP | 0 245 737 | 11/1987 |
| EP | 0 298 943 | 1/1989 |
| GB | 2 001 547 | 2/1979 |
| WO | WO 90/03220 | 4/1990 |
| WO | WO 2010/016792 | 2/2010 |

* cited by examiner

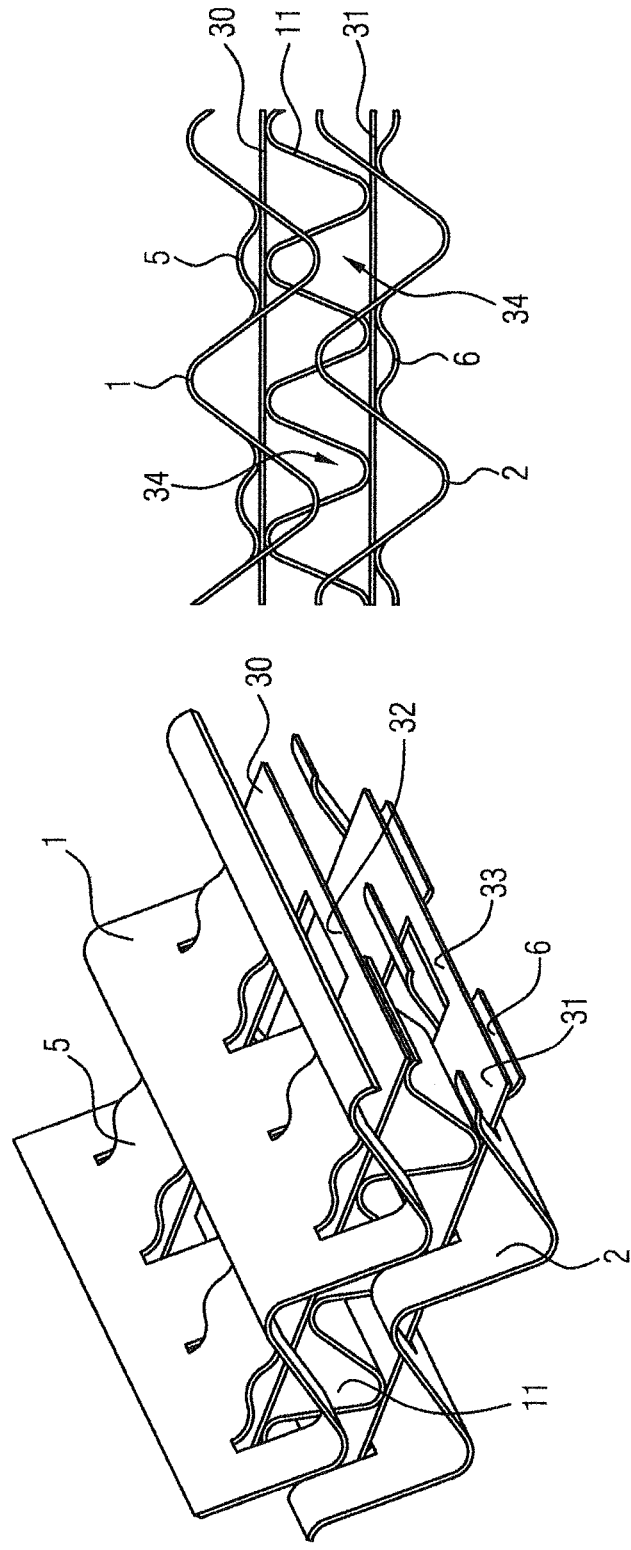

HONEYCOMB BODY FOR EXHAUST GAS AFTERTREATMENT

CROSS REFERENCE TO RELATED APPLICATIONS

This is a U.S. national stage of application No. PCT/EP2017/062041, filed on May 18, 2017. Priority is claimed on German Application No. DE102016209058.5, filed May 25, 2016, the content of which is incorporated here by reference.

BACKGROUND OF THE INVENTION

Technical Field

The invention relates to a honeycomb body for an exhaust-gas aftertreatment unit, having a multiplicity of layers stacked one on top of the other. Substantially smooth layers and at least partially structured layers are stacked one on top of the other in alternating fashion and flow channels are formed between the layers that run along the axial extent of the honeycomb body and can be flowed through in the axial direction. The structured layers have undulations formed by successive undulation peaks and undulation troughs, wherein, out of mutually adjacently arranged undulation troughs of a structured layer, there are formed protuberances in the direction of the undulation peaks belonging to the respective layer.

Description of the Prior Art

Honeycomb bodies are formed substantially from ceramic material or as metallic honeycomb bodies composed of multiple layers. In the case of metallic honeycomb bodies, a distinction is made primarily between two typical structural forms.

An early structural form, typical examples of which are presented in DE 29 02 779 A1, is the spiral-shaped structural form, in the case of which a substantially smooth and an undulating sheet-metal layer are placed one on top of the other and wound in spiral fashion. In the case of another structural form, the honeycomb body is formed from a multiplicity of alternately arranged smooth and undulating or differently undulating sheet-metal layers, wherein the sheet-metal layers are firstly arranged in one or more stacks and are then wound together. Here, ends of all of the sheet-metal layers come to lie at the outside, and can be connected to a housing or casing tube, giving rise to numerous connections, which increase the durability of the honeycomb body. Typical examples of these structural forms are described in EP 0 245 737 B1 or WO 90/03220.

In particular in the case of metallic honeycomb bodies, it has been found that these deform over the course of time during use in the exhaust system of an automobile due to fluctuating thermal loads. In particular, it is known that the honeycomb body telescopes, that is to say one part of the honeycomb body partially slides out of an end side of the honeycomb body owing to the pulsating gas flows to which it is exposed, or the honeycomb body assumes a barrel shape, that is to say the diameter of the honeycomb body decreases in size in the region of the gas inlet and/or gas outlet side. These and other deformations lead to, or are based on, the displaceability of adjacent walls of the cavities in the flow direction, such as can arise for example in the absence of a connection, or in the case of a defective connection, to adjacent walls of the cavities, such a connection preferably being formed by thermal joining methods such as for example brazing or welding.

A disadvantage of the devices in the prior art is that to produce a durable honeycomb body use must be made of joining methods such as brazing or welding to prevent relative movement of the layers in the axial direction of extent of the honeycomb body. These methods form a major part of the production method of a honeycomb body and thus make the end product much more expensive.

SUMMARY OF THE INVENTION

It is an object of one aspect of the present invention to provide a honeycomb body that has an optimized construction and which is more stable with regard to an axial displacement of the layers relative to one another. It is also an object to provide a honeycomb body in the case of which the individual layers do not need to be connected to one another by an additional brazing process or welding process.

An exemplary embodiment of the invention relates to a honeycomb body for an exhaust-gas aftertreatment unit, having a multiplicity of layers stacked one on top of the other. Flow channels are formed between the layers, which flow channels run along the axial extent of the honeycomb body and can be flowed through in the axial direction. The honeycomb body has first structured layers, wherein the structure is formed by successive undulation peaks and undulation troughs. Out of mutually adjacently arranged undulation troughs of a first structured layer, there are formed protuberances in the direction of the undulation peaks belonging to the respective layer, wherein, due the mutually adjacently arranged protuberances of a first structured layer, a channel-like structure running in a circumferential direction of the honeycomb body is formed in the first structured layer, into which channel-like structure a second layer is placed such that the second layer is fixed relative to the first structured layer in the axial direction.

Honeycomb bodies are generally formed from a multiplicity of layers of metallic foils. Use may alternatively also be made of nonwovens or knitted fabrics. The layers are stacked one on top of the other and are inserted into a housing. In a large number of the applications, the honeycomb bodies have a circular cross section, and the layers are wound before being inserted into a housing, in order to generate a shape of the layer stack adapted to the cross section.

The honeycomb body has an extent direction in an axial direction, which is normally identical to the main throughflow direction of the honeycomb body. The circumferential direction of the honeycomb body is oriented transversely with respect to the axial direction of extent, and runs in the direction of the circumference of the honeycomb body. The honeycomb body may have circular cross sections or polygonal cross sections.

According to one aspect of the invention, the honeycomb body has a multiplicity of layers. These may be at least partially structured or may be of entirely smooth form. The at least partially structured layers may preferably have undulating cross sections. Undulating cross sections mean that a succession of undulation peaks and undulation troughs is formed in the layer. The undulation length refers, in simplified terms, to the spacing of the mutually directly adjacently arranged undulation peaks or the undulation troughs to one another. The undulation peaks and undulation troughs constitute the structure maxima. Here, the undulation peaks are normally deflected out of the originally smooth layer in the opposite direction to the undulation troughs.

In the present case, undulation peaks refer to the deformations of the layer in the respective first direction, and undulation troughs refer to the deformations of the layer in the respective second direction, which is opposite to the first direction. The expressions "undulation trough" or "undulation peak" thus merely characterize the formations in relation to one another, but considered individually do not designate a particular deformation direction. A region primarily referred to as undulation trough may thus basically also, by definition, be turned into an undulation peak, and vice versa, by virtue of the layer itself being rotated.

The protuberances describe partial regions of the undulation peaks or undulation troughs at which the material of the structured layer is deflected out of the rest of the undulating pattern. The protuberances are arranged in particular at the highest or lowest points of the undulation peaks or undulation troughs respectively. A protuberance may for example be generated by virtue of the tip of an undulation peak being pushed in counter to the deformation direction of the undulation peak itself.

A channel-like structure refers in particular to an arrangement of multiple protuberances situated in alignment with one another in a circumferential direction of the honeycomb body. Viewed in the circumferential direction, the protuberances in this case form a type of channel that is delimited at least in sections on three sides by the mutually adjacently arranged non-protruding regions of the undulation troughs or undulation peaks. The protruding regions thus give rise, in the circumferential direction of the honeycomb body, to, as it were, a negative intersection between the structured layer and a rectangular body, which intersects the undulation peaks or the undulation troughs as far as the depth of the protruding material.

Into this channel-like structure, there is preferably placed a smooth layer that is either formed as a strip-like element and, in each case only along a single channel-like structure, placed into said channel-like structure, or into multiple mutually adjacently arranged channel-like structures of a structured layer. For this purpose, it is for example possible for multiple sections of a smooth layer, which can be placed in each case into one channel-like structure, to be connected to one another by means of connecting elements.

Owing to the spatial delimitation of the channel-like structure in particular along the axial direction of extent of the honeycomb body, a relative movement of the smooth layer relative to the structured layer along the axial extent direction of the honeycomb body is limited or is prevented entirely.

It is particularly advantageous if the protuberances have an extent delimited in the axial direction of the honeycomb body. The channel-like structure is formed for the first time by this delimitation of the protuberances, such that a limitation of the relative movement of a smooth layer relative to a structured layer is made possible for the first time.

It is also advantageous if a second layer is arranged between two mutually adjacently arranged first structured layers, wherein the second layer has an undulating structure formed by mutually adjacently arranged undulation peaks and undulation troughs, wherein the undulation length of the second layer is shorter than the undulation length of the first structured layer.

Here, the undulation length describes, in simplified terms, the spacing between two successive undulation peaks or two successive undulation troughs. For example, from the lowest point of the first undulation trough to the lowest point of the following undulation trough. The undulation length of the second layer, which preferably has an undulating structure, is shorter than the undulation length of the first layers, between which the second layer is arranged. This prevents the second layer from being able to become interlocked with the first layer in the circumferential direction of the honeycomb body by virtue of the maxima formed by the undulation peaks and undulation troughs engaging the undulation peaks or undulation troughs of the first layer. The undulation length is preferably in particular shorter than the length of the contact surfaces, formed by the protuberances, of the first layers in the circumferential direction of the honeycomb body.

It is furthermore expedient if the undulation length of the undulating second layer is so short that the mutually directly adjacently arranged undulation peaks or the mutually directly adjacently arranged undulation troughs are in contact with one another. In this way, the interlocking of the second layer in the first layer in the circumferential direction of the honeycomb body is prevented in a particularly effective manner.

It is furthermore preferable if a multiplicity of second layers is arranged between two mutually adjacently arranged first structured layers, wherein the second layers are formed by smooth layers and/or by second structured layers. By an additional second smooth layer, which is arranged between a structured second layer and the first layer, the interlocking of the individual layers in the circumferential direction of the honeycomb body can be prevented in a particularly effective manner.

It is also advantageous if the channel-like structure is delimited in the axial direction of the honeycomb body by the non-protruding regions of the undulation troughs. This serves for delimiting the spatial extent of the channel-like structure in the axial direction of the honeycomb body.

A preferred exemplary embodiment is characterized in that the extent of the second layer, placed into the channel-like structure, in the axial direction of the honeycomb body is equal to or shorter than the extent of the protuberances in the axial direction of honeycomb body. By such a configuration, it is achieved that the smooth layer can be placed into the channel-like structure without the need for deformation, and a restriction of the relative movement in the axial direction of the honeycomb body with respect to the structured layer is realized. It is particularly preferable if the extent of the smooth layer in the axial direction is selected such that said smooth layer can be placed in the channel-like structure in an accurately fitting manner.

It is also preferable if two mutually adjacently arranged first structured layers each have protuberances at the undulation troughs facing one another, wherein the protuberances of the two first structured layers point away from one another toward the respective undulation peaks.

In this way, two channel-like structures facing toward one another are realized, wherein in each case one channel-like structure is formed in each case in one of the structured layers. As already mentioned further above, the terms "undulation peak" or "undulation trough" define in each case the relative orientation of the undulations in relation to an individual structured layer. Therefore, depending on the definition, the undulation peaks of a structured layer may both face toward the undulation peaks of an adjacent structured layer and face toward the undulation troughs of the adjacent structured layer.

It is furthermore advantageous if the protuberances have an undulating cross section. This is advantageous because such a form of the protuberance can be easily generated using a deep-drawing tool or the like. By an undulating design of the cross section, it is additionally possible for a further section of a flow channel to be generated between the protuberance and a smooth layer lying against the protuberance, whereby the flow through the honeycomb body as a whole is improved.

It is furthermore advantageous if the channel-like structure at a first structured layer is formed by the protuberances aligned with one another in the circumferential direction. This is advantageous because, in this way, a channel-like structure is realized which extends in the circumferential direction of the honeycomb body. In this way, the relative movement of the layers with respect to one another in the axial extent direction of the honeycomb body is in particular minimized or prevented entirely, whereas a relative movement of the layers with respect to one another in the circumferential direction of the honeycomb body remains possible. This is advantageous in particular during the production process, because here the layers are often wound around one or more axes which are oriented axially parallel with respect to the central axis of the honeycomb body, as a result of which a relative movement of the layers with respect to one another in the circumferential direction may occur.

It is also expedient if the first structured layers have multiple protuberances spaced apart from one another in the axial direction of the honeycomb body, wherein multiple channel-like structures running parallel to one another in the circumferential direction of the honeycomb body are formed by the protuberances arranged spaced apart from one another. This is advantageous for preventing the relative movement of the layers with respect to one another in the axial extent direction of the honeycomb body along the entire axial extent of the honeycomb body, and thus producing a stronger structure framework.

It is furthermore advantageous if three second layers are arranged between two mutually adjacently arranged first structured layers, wherein one of the second layers is formed by an undulating intermediate layer, wherein the undulating intermediate layer lies at both sides on a second layer formed by a smooth layer and engages into the channel-like structures of the respective first structured layers.

The intermediate layer may likewise be of undulating form, and serves firstly for spacing the two structured layers apart from one another, and furthermore for also forming sections of flow channels. Here, the intermediate layer is preferably designed such that mutually adjacent structured layers, or the undulating formations thereof, do not interlock with one another, which would in particular impede the manufacturing process because a relative movement in the circumferential direction of the honeycomb body, such as is required for the winding, would be prevented.

It is furthermore expedient if two smooth layers and one intermediate layer are arranged between two structured layers, wherein in each case one smooth layer is placed into in each case one channel-like structure of one of the structured layers, and the intermediate layer is arranged between the two smooth layers, wherein the intermediate layer engages into the two channel-like structures and spaces the two structured layers apart from one another.

In this way, a structure is produced which reliably prevents the relative movement of mutually adjacently arranged layers in the axial extent direction of the honeycomb body. By having the smooth layers between the intermediate layer and the structured layers, an interlocking of the individual layers during a relative movement in the circumferential direction is furthermore prevented in an effective manner.

It is furthermore advantageous if the relative movement between two mutually adjacently arranged first structured layers in the axial direction of the honeycomb body is limited by the engagement of the structured intermediate layer into the channel-like structures of the first structured layers. This increases the stability of the honeycomb body and furthermore eliminates the need for a fixing, produced for example by brazing, for the purposes of preventing the relative movement in the axial direction.

It is also preferable if two directly mutually adjacently arranged structured layers are oriented such that the undulation peaks and the undulation troughs respectively are situated in alignment with one another. This is expedient in particular for the configuration of the flow channels because, in this way, longer flow sections are formed as viewed along the axial extent direction, whereby less turbulence is generated as the flow passes through the honeycomb body, and the pressure loss is reduced.

It is furthermore expedient if a first structured layer has, in alternating fashion in the axial direction of the honeycomb body, undulation troughs protruding in the direction of the undulation peaks and undulation peaks protruding in the direction of the undulation troughs.

It is also advantageous if the first structured layer, owing to the arrangement of the protuberances, has channel-like structures in alternating fashion on the top side and on the bottom side, said channel-like structures being formed in each case by the protuberances, wherein the channel-like structures are arranged spaced apart from one another in the axial direction of the honeycomb body.

This is advantageous for producing structured layers which, on both sides, have a channel-like structure for the placement of smooth layers. This is particularly expedient in particular with regard to the fact that, often, a multiplicity of different layers are stacked one on top of the other. It is thus possible to produce arbitrarily scalable stacks of layers, wherein a structured layer is followed in each case on both sides by a smooth layer, which is in each case again followed by an intermediate layer, followed by a further smooth layer, and finally the next structured layer.

It is furthermore advantageous if at least one structured layer has both undulation troughs protruding in the direction of the undulation peaks and undulation peaks protruding in the direction of the undulation troughs, wherein the protuberances of the undulation peaks, which form a channel-like structure on one side, and the protuberances of the undulation troughs, which form a channel-like structure on the opposite side, are arranged so as not to be offset with respect to one another in the axial direction of the honeycomb body. This is advantageous in order to produce, on both sides of the structured layer, channel-like structures which are arranged so as not to be offset with respect to one another in the axial direction of extent of the honeycomb body.

It is furthermore advantageous if a multiplicity of channel-like structures is formed so as to be parallel and adjacent to one another, wherein at least one smooth layer is placed in each of the channel-like structures, wherein the smooth layers that have been placed in are connected to one another by connecting elements.

This has the effect that even honeycomb bodies with a relatively long axial extent exhibit adequate strength, and a limitation of the relative movement of the layers with respect to one another in the axial direction is achieved over the entire axial extent of the honeycomb body.

It is also preferable if the connecting elements project over partial regions of a first structured layer which forms the channel-like structures, wherein the first structured layer is likewise of smooth form in the region of the connecting elements, such that a relative movement between the connecting elements and the first structured layer in the circumferential direction of the honeycomb body is possible.

This can be realized by a smooth layer that has punched-out portions through which the in each case structured regions of the adjacent structured layers can project. In the region of the channel-like structures of the structured layers, the smooth layer is formed in the manner of a strip and so as to exhibit an accurate fit with respect to the respective channel-like structure. The connection between these regions, placed into the channel-like structure, of the smooth layer is realized by webs. To permit a relative movement of the layers with respect to one another in the circumferential direction, such as arises for example during the production process, in particular during the winding of the layers, the structured foils, in the region of the webs, are of smooth form or at least have a structure which has such slight deflections that a relative movement of the smooth layer in the circumferential direction relative to the structured layer is possible.

The connecting elements are preferably arranged at the outer end regions of the smooth layer as viewed in the circumferential direction. This has the advantage that the connecting elements are not arranged between individual undulation peaks or undulation troughs. The structured layer can thus be of simpler design, because an interlocking of the connecting elements with the undulation peaks or undulation troughs of the structured layer is prevented. In particular, the relative movement in the circumferential direction between the structured layers and the smooth layers, such as arises during the production process, can thus take place without problems without causing an interlocking of the layers with one another.

For this purpose, the smooth layer advantageously has a longer extent along the circumferential direction than the structured layer, in order to ensure that the connecting elements at both end regions situated in the circumferential direction lie outside the structured regions of the structured layer.

BRIEF DESCRIPTION OF THE DRAWINGS

The invention will be discussed in detail below on the basis of exemplary embodiments and with reference to the drawings. In the drawings:

FIG. 3A is a perspective view of a layer stack, wherein the connecting elements between the smooth regions placed into the channel-like structures are arranged outside the undulation of the structured layer;

FIG. 3B is a view of the layer stack along the main throughflow direction of the flow channels formed by the layers.

PREFERRED EMBODIMENT OF THE INVENTION

Figure 1:
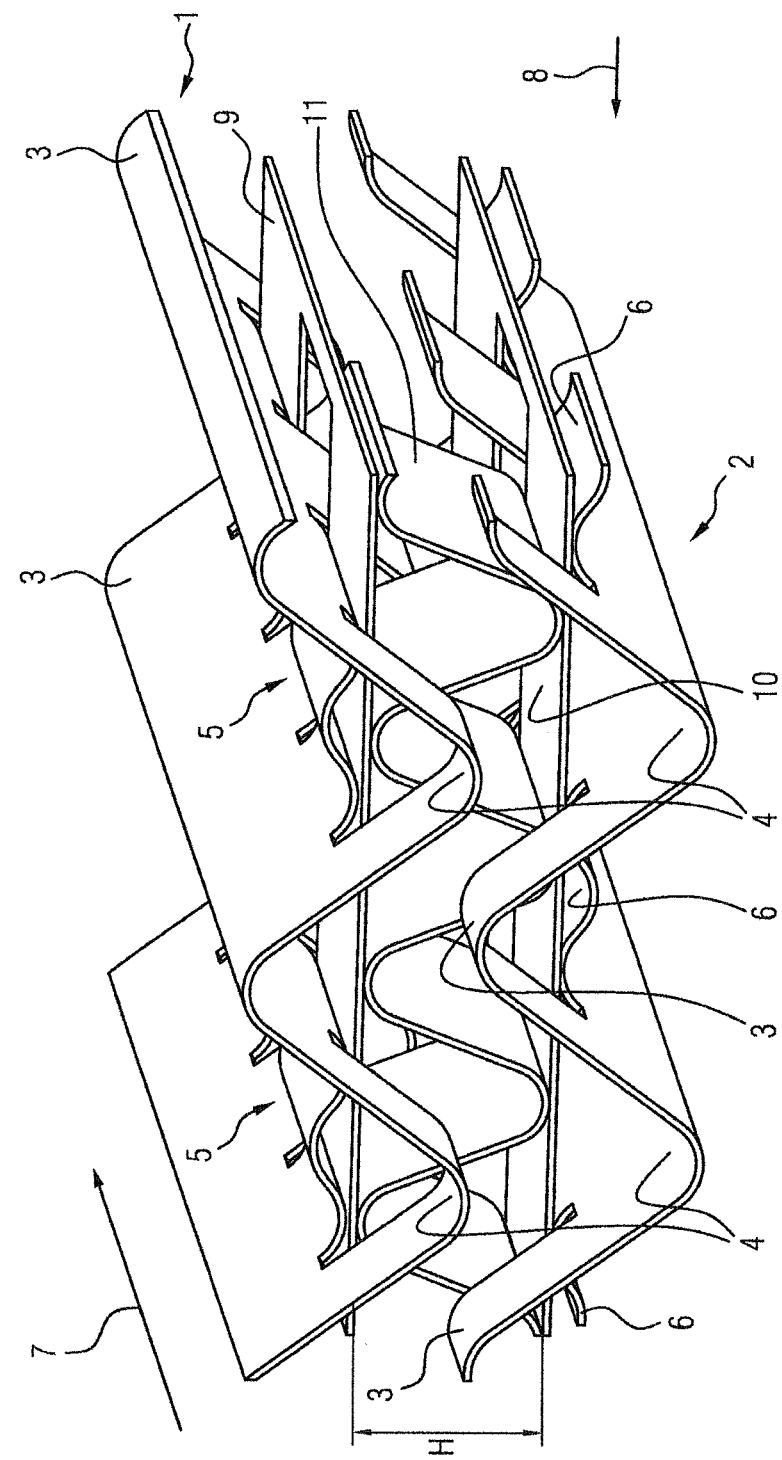
FIG. 1 is a perspective view of a partial detail of a layer stack of a honeycomb body, wherein two mutually adjacently arranged structured layers with two smooth layers arranged in between and with an undulating intermediate layer arranged in between are shown.

FIG. 1 shows a perspective view of a stack of multiple layers 1, 2, 9, 10, and 11. The layers 1 2, 9, 10, and 11 are formed for example by metal foils. Here, FIG. 1 shows only a partial detail of a honeycomb body. A multiplicity of further layers may be arranged above and below the detail shown.

In relation to the complete honeycomb body, which is shown only in the form of a small detail in FIG. 1, the axial extent direction of the honeycomb body runs along the arrow 7. The main flow through the honeycomb body also takes place in said axial extent direction 7. The direction indicated by the arrow 8 corresponds to the circumferential direction of the honeycomb body.

FIG. 1 shows two mutually adjacently arranged structured layers 1, 2. The structured layers 1, 2 have an undulating profile, wherein each of the structured layers 1, 2 has undulation peaks 3 and undulation troughs 4 in alternating fashion. The undulation peaks 3 and the undulation troughs 4 form the structure maxima of the respective structured layer 1, 2.

The undulation troughs 4 of the upper structured layer 1 have protuberances 5 which are formed out of the tip of the undulation troughs 4 toward the respective undulation peaks 3 of the structured layer 1.

The lower structured layer 2 has protuberances 6 which are formed out of the tips of the undulation peaks 3 toward the undulation troughs 4 of the structured layer 2.

The protuberances 5, 6 have an undulating cross section. By the protuberances 5, 6, a channel-like structure is formed in each of the structured layers 1, 2, which channel-like structure is delimited laterally, that is to say in the axial extent direction 7 of the honeycomb body, by the respective undulation peaks 3 or undulation troughs 4 out of which the protuberances 5, 6 have been formed.

In the exemplary embodiment of FIG. 1, both the structured layers 1 and 2 and the intermediate layer 11 have an undulating form. In alternative embodiments, it is also possible for undulations of some other form, such as for example V-shaped, W-shaped, or polygonal undulating profiles, to be provided. The same applies to the cross section of the protuberances 5 and 6, which in an alternative embodiment may also be smooth.

In FIG. 1, the undulation troughs 4 of the two structured layers 1, 2 are, like the undulation peaks 3, situated in alignment with one another. During the assembly process, in particular during the winding of the honeycomb body, relative movements may occur along the circumferential direction 8 of the honeycomb body, whereby the position of the undulation troughs 4 and of the undulation peaks 3 of the two structured layers 1, 2 relative to one another may change.

In a view along the circumferential direction 8 of the honeycomb body, the protuberances 5, 6 produce a rectangular aperture in the respective undulation peaks 3 and undulation troughs 4.

In each case one smooth layer 9 or 10 respectively is placed into said channel-like structure. Here, the smooth layers 9, 10 lie against the protuberances 5, 6 and are supported in the axial extent direction 7 relative to the respective undulation peaks 3 and undulation troughs 4.

Arranged between the smooth layers 9, 10 is an intermediate layer 11, which is likewise of undulating design. The height H of the intermediate layer is advantageously selected such that the undulation troughs 4 of the upper structured layer 1 and the undulation peaks 3 of the lower structured layer 2 do not come into contact with one another during a relative movement along the direction 8, and interlocking is thus prevented.

The advantage of a structure of the honeycomb body designed as in FIG. 1 lies in the fact that, by the design of the protuberances 5, 6, interlocking of the different layers 1, 2, 9, 10, and 11 is generated along the axial direction 7, while at the same time mobility along the circumferential direction 8 is maintained. It is thus possible for the telescoping of the honeycomb body, that is to say a pulling-apart of the individual layers in the axial direction 7, to be prevented in an effective manner. At the same time, the relative movement of the layers 1, 2, 9, 10, and 11 in the circumferential direction 8, such as inevitably arises at least during the production process, can be permitted, without the flow channels generated by the undulations being destroyed.

Owing to the mechanical limitation of the relative movement of the layers 1, 2, 9, 10, and 11 with respect to one another, it is possible, after the winding of the layers 1, 2, 9, 10, and 11, to dispense entirely with the use of a joining process, such as for example brazing or welding, for the purposes of connecting said layers to one another.

Figure 2:
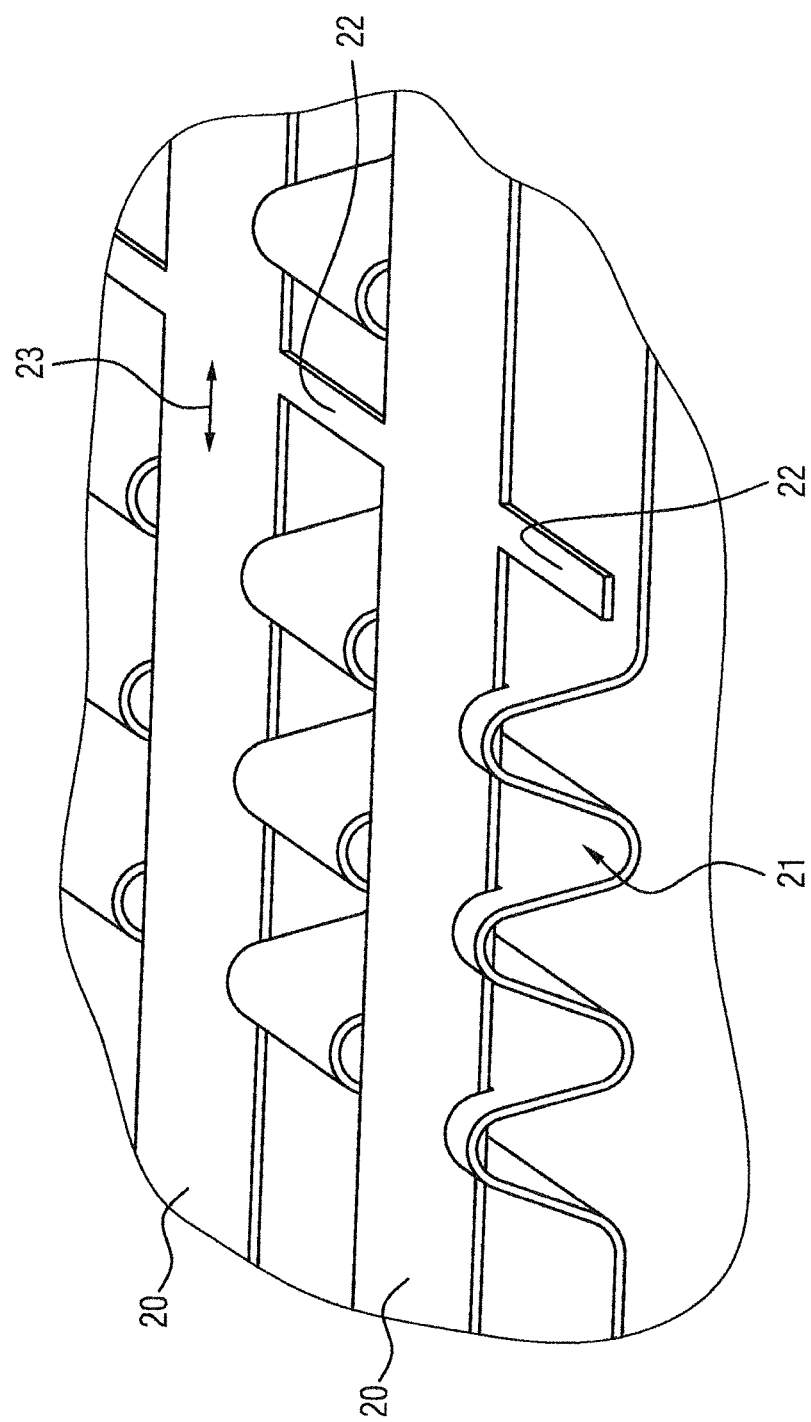
FIG. 2 is a view of an exemplary embodiment, wherein those sections of the smooth layer which are placed into mutually adjacent channel-like structures are connected to one another by means of webs.

FIG. 2 shows an alternative embodiment of a honeycomb body, wherein those regions of the smooth layer 20, which have been placed into the respective channel-like structures of the structured layer 21, are connected to one another by webs 22. Here, the webs 22 are arranged in regions of the structured layer 21 in which the structured layer 21 has no undulation. Accordingly, the structured layer 21 also has at least partial regions which are not structured, but are of smooth form.

Alternatively, a structure may also be formed in these regions of the webs 22 if the structure has such a low height extent that interlocking with the webs 22 is prevented.

Owing to the regions of the structured layer 22 which are not structured or which have little structuring, a relative movement of the smooth layer 20 with respect to the structured layer 21 in the circumferential direction 23 of the honeycomb body is possible, whereas, owing to the abutment of the strip-like regions of the smooth layer 20 in the channel-like structures of the structured layer 21, a relative movement in the axial direction is prevented.

It is likewise possible, as shown in the exemplary embodiment of FIG. 1, for a structured intermediate layer to be placed onto the smooth layer 20 and to also be followed by further structured layers 21 and smooth layers 20, in order to produce an adequately tall layer stack for forming the honeycomb body.

In an alternative embodiment, those regions of the structured layer which are of smooth form or which have only a low height may also be arranged offset with respect to one another.

FIG. 3A shows, two structured layers 1, 2 such as have already been shown in FIG. 1. Smooth layers 30, 31 are arranged between the structured layers 1, 2. The smooth layers 30, 31 each have multiple strip-like regions which are placed in each case in one of the channel-like structures which are formed by the protuberances 5, 6 in the structured layers 1, 2. Between the smooth layers, there is arranged a further structured layer 11, such as has already been shown in FIG. 1. Said layer serves for spacing the smooth layers 30, 31 and the structured layers 1, 2 apart from one another.

The strip-like regions of the smooth layers 30, 31 are connected to one another by means of webs 32, 33, such that the strip-like regions and the webs 32 collectively form the smooth layer 30, and the webs 33 with the associated strip-like regions form the smooth layer 31.

The webs 32 and 33 are preferably, as viewed in the circumferential direction, arranged in a region outside the undulation of the structured layers 1, 2. In this way, a relative movement can take place between the structured layers 1, 2 and the smooth layers 30, 31 without the webs 32, 33 engaging into, and interlocking with, the undulation of the structured layers 1, 2.

A connection of the strip-like regions by webs in this region situated outside the undulation is advantageous in order to facilitate the assembly of the layer stack, because the webs do not need to be aligned with special non-structured regions of the structured layers 1, 2, or there is even no need for the structured layers 1, 2 to have non-structured regions.

FIG. 3B, shows the flow channels 34 which form between the individual layers 1, 2, 30 and 31 owing to the different undulations of the layers 1, 2 and 11.

The exemplary embodiment of FIGS. 3A and B constitute a further development of the exemplary embodiment of FIG. 2, with an optimized arrangement of the webs 32 and 33.

Figure 4A:
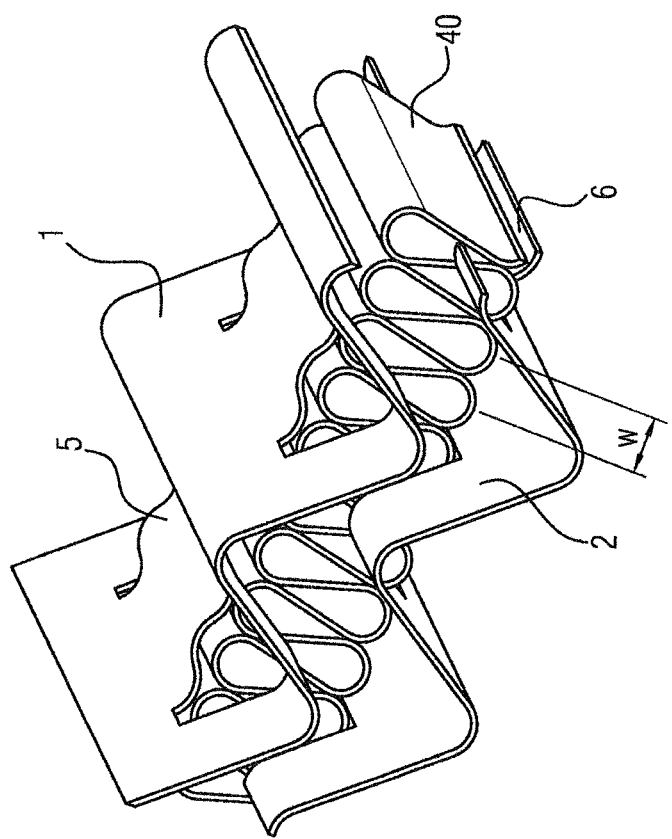
FIG. 4A is in the left-hand part, a perspective view of a layer stack, wherein, between two structured layers, there is arranged a further structured or undulating layer, wherein the undulation lengths of the individual layers differ.
Figure 4B:
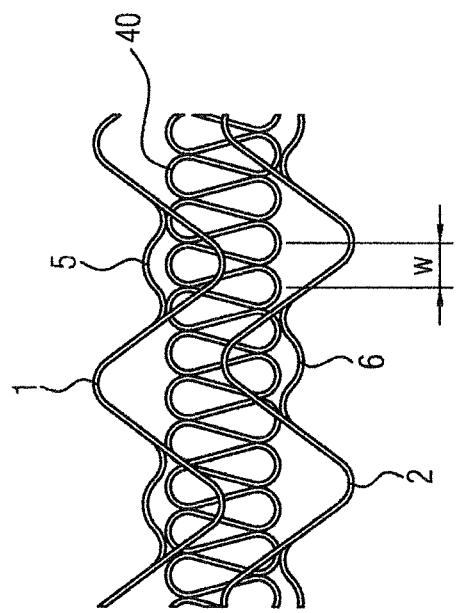
FIG. 4B is a view of the layer stack along the main throughflow direction of the flow channels formed by the layers.

FIG. 4A shows, an alternative embodiment of a layer stack. This figure shows in particular the structured layers 1, 2 that have already been shown in FIG. 1. In FIGS. 4A, 4B, by contrast to FIG. 1, only a single layer 40 is arranged between the structured layers 1, 2. Said intermediate layer 40 is likewise structured by means of an undulation. Similarly to the smooth layers 9, 10 of FIG. 1, the layer 40 has an axial extent which makes it possible for the layer 40 to be placed into the channel-like structures of the structured layers 1, 2.

The layer 40 has an undulation which has a much shorter undulation length w than that of the structured layers 1, 2. In the exemplary embodiment of FIGS. 4A and 4B, the undulation length w is so short that the mutually directly adjacent undulation peaks and undulation troughs lie against one another in the circumferential direction of the honeycomb body. In this way, an intermediate layer 40 is advantageously realized which firstly ensures that the structured layers 1, 2 are reliably spaced apart and which furthermore prevents a relative movement in the axial direction of the honeycomb body. At the same time, owing to the very short undulation length w, the undulation peaks or undulation troughs of the layer 40 are prevented from interlocking with the undulation peaks or undulation troughs of the structured layers 1 or 2 and thus preventing a relative movement in the circumferential direction between the layers 1, 2, and 40.

Here, the undulation length w of the layer 40 must in each case remain so short that the spacing in the circumferential direction between two mutually directly adjacently arranged undulation peaks or undulation troughs remains shorter than the length, in the circumferential direction, of the contact surfaces, formed by the protuberances, on the structured layers 1, 2. Otherwise, it would be possible for one of the undulation peaks or one of the undulation troughs of the layer 40 to engage into the undulation of the structured layers 1 or 2 to a greater depth than the contact surface of the protuberance, thus leading to interlocking.

The exemplary embodiments in FIGS. 1 to 4 are in particular not of a limiting nature, and serve for illustrating the concept of the invention. The features of the exemplary embodiments of FIGS. 1 to 4 may also be combined with one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A honeycomb body for an exhaust-gas aftertreatment unit, comprising:
   a plurality of layers stacked one on top of the other, wherein flow channels that run along an axial extent of the honeycomb body and can be flowed through in an axial direction are formed between the plurality of layers,
   wherein first structured layers of the plurality of layers have their structure formed by successive undulation peaks and undulation troughs,
   wherein protuberances are formed out of mutually adjacently arranged undulation troughs of a first structured layer in a direction of the undulation peaks belonging to a respective layer,
   wherein, mutually adjacently arranged protuberances of a first structured layer form a channel-like structure running in a circumferential direction of the honeycomb body in the first structured layer, into which channel-like structure a second structured layer is placed such that the second structured layer is fixed relative to the first structured layer in the axial direction,
   wherein the second structured layer is sandwiched between two first structured layers.

2. The honeycomb body as claimed in claim 1, wherein the protuberances have an extent delimited in the axial direction of the honeycomb body.

3. The honeycomb body as claimed in claim 2, wherein a multiplicity of second layers is arranged between two mutually adjacently arranged first structured layers, wherein the multiplicity second layers are formed by one of smooth layers or by second structured layers.

4. The honeycomb body as claimed in claim 2, wherein an extent of the second layer, placed into the channel-like structure, in the axial direction of the honeycomb body is equal to or shorter than the extent of the protuberances in the axial direction of honeycomb body.

5. The honeycomb body as claimed in claim 2, wherein a multiplicity of channel-like structures is formed so as to be parallel and adjacent to one another, wherein at least one smooth layer is placed in each of the channel-like structures, wherein smooth layers that have been placed in are connected to one another by connecting elements.

6. The honeycomb body as claimed in claim 5, wherein the connecting elements project over partial regions of a first structured layer which forms the channel-like structures, wherein the first structured layer is of smooth form in a region of the connecting elements, such that a relative movement between the connecting elements and the first structured layer in the circumferential direction of the honeycomb body is possible.

7. The honeycomb body as claimed in claim 1, wherein a second layer is arranged between two mutually adjacently arranged first structured layers, wherein the second layer has an undulating structure formed by mutually adjacently arranged undulation peaks and undulation troughs,
   wherein an undulation length of the second layer is shorter than an undulation length of the first structured layer.

8. The honeycomb body as claimed in claim 7, wherein the undulation length of the undulating second layer is so short that mutually directly adjacently arranged undulation peaks or mutually directly adjacently arranged undulation troughs are in contact with one another.

9. The honeycomb body as claimed in claim 1, wherein the channel-like structure is delimited in the axial direction of the honeycomb body by non-protruding regions of the undulation troughs.

10. The honeycomb body as claimed in claim 1, wherein two mutually adjacently arranged first structured layers each have protuberances at the undulation troughs facing one another, wherein the protuberances of the two first structured layers point away from one another toward respective undulation peaks.

11. The honeycomb body as claimed in claim 1, wherein the channel-like structure at a first structured layer is formed by the protuberances aligned with one another in the circumferential direction.

12. The honeycomb body as claimed in claim 1, wherein the first structured layers have multiple protuberances spaced apart from one another in the axial direction of the honeycomb body, wherein multiple channel-like structures running parallel to one another in the circumferential direction of the honeycomb body are formed by the protuberances arranged spaced apart from one another.

13. The honeycomb body as claimed in claim 1, wherein a first structured layer has, in alternating fashion in the axial direction of the honeycomb body, undulation troughs protruding in the direction of the undulation peaks and undulation peaks protruding in the direction of the undulation troughs.

14. The honeycomb body as claimed in claim 13, wherein the first structured layer, due to the arrangement of the protuberances, has channel-like structures in alternating fashion on the top side and on the bottom side, the channel-like structures being formed by the protuberances, wherein the channel-like structures are arranged spaced apart from one another in the axial direction of the honeycomb body.

15. The honeycomb body as claimed in claim 1, wherein at least one first structured layer has both undulation troughs protruding in the direction of the undulation peaks and undulation peaks protruding in the direction of the undulation troughs, wherein the protuberances of the undulation peaks, which form a channel-like structure on one side, and the protuberances of the undulation troughs, which form a channel-like structure on the opposite side, are arranged so as not to be offset with respect to one another in the axial direction of the honeycomb body.

16. The honeycomb body as claimed in claim 1, further comprising:
   a planar layer defining rectangular openings, wherein a plurality of undulations of the second layer extend through a respective opening.

17. The honeycomb body as claimed in claim 1, further comprising:
a planar layer arranged between the second structured layer and a respective first structured layer.

18. The honeycomb body as claimed in claim 1, wherein the first structured layers have a greater axial length than the second structured layer.

19. The honeycomb body as claimed in claim 1, wherein the second structured layer is arranged axially entirely within the channel of the first structured layers.

20. A honeycomb body for an exhaust-gas aftertreatment unit, comprising:
a plurality of layers stacked one on top of the other, wherein flow channels that run along an axial extent of the honeycomb body and can be flowed through in an axial direction are formed between the plurality of layers,
wherein first structured layers of the plurality of layers have their structure formed by successive undulation peaks and undulation troughs,
wherein protuberances are formed out of mutually adjacently arranged undulation troughs of a first structured layer in a direction of the undulation peaks belonging to a respective layer,
wherein, mutually adjacently arranged protuberances of a first structured layer form a channel-like structure running in a circumferential direction of the honeycomb body in the first structured layer, into which channel-like structure a second structured layer is placed such that the second structured layer is fixed relative to the first structured layer in the axial direction,
wherein the protuberances have an extent delimited in the axial direction of the honeycomb body, and
wherein three second layers are arranged between two mutually adjacently arranged first structured layers, wherein one of the second layers is formed by an undulating intermediate layer, wherein the undulating intermediate layer lies at both sides on a second layer formed by a smooth layer and engages into the channel-like structures of the respective first structured layers.

21. The honeycomb body as claimed in claim 20, wherein relative movement between two mutually adjacently arranged first structured layers in the axial direction of the honeycomb body is limited by engagement of the structured intermediate layer into the channel-like structures of the first structured layers.

* * * * *